United States Patent [19]
Denker et al.

[11] Patent Number: 4,819,199
[45] Date of Patent: Apr. 4, 1989

[54] EXTREMA CODER EMPLOYING NOISY LIMITING AMPLIFIER STAGES

[75] Inventors: Roger H. Denker, Falls Church; Arie Visser, Reston, both of Va.

[73] Assignee: Extrema Systems International Corporation, Reston, Va.

[21] Appl. No.: 42,156

[22] Filed: Apr. 24, 1987

[51] Int. Cl.[4] .......................... G06G 7/00; G06G 7/18; G06J 1/00; H03K 5/153
[52] U.S. Cl. ..................................... 364/807; 307/351; 307/354; 307/540; 364/602; 364/828
[58] Field of Search ............... 364/807, 825, 829, 602, 364/605, 828; 381/41, 46, 47; 331/78; 307/351, 354, 540, 542; 328/150, 169; 330/149

[56] References Cited

U.S. PATENT DOCUMENTS 4,079,327  3/1978  Van Uffelen ................. 307/354 X
4,262,257  4/1981  Lawrence ..................... 307/351 X
4,545,065  10/1985  Visser ......................... 381/47 X
4,700,360  10/1987  Visser ......................... 381/31 X Primary Examiner—Joseph Ruggiero

[57] ABSTRACT

An extrema coding circuit comprising a differentiator and a noisy limiting-amplifier. The limiting-amplifier may comprise any one of a number of commercially available limiting-amplifier integrated circuits, for example, a limiting-amplifier front end of an FM IF amplifier and detector integrated circuit. The limiting-amplifier is operated so that the input voltages provided to it are in the order of magnitude of broadband noise generated internally by the limiting-amplifier stages. Accordingly, the limiting-amplifier stages encode the differentiated analog signal and the internally generated noise signal into an extrema coded signal, i.e., a signal wherein the times of occurrence of extrema are represented as transitions of a binary signal. Because of the high gain of the limiting-amplifier stages, these stages perform infinite clipping. The extrema coded signal contains information sufficient to enable substantial reproduction of the original analog signal therefrom. In order to reproduce the input analog signal, the extrema coded signal may be fed to an integrating stage.

12 Claims, 2 Drawing Sheets

EXTREMA CODER EMPLOYING NOISY LIMITING AMPLIFIER STAGES

BACKGROUND OF THE INVENTION

The present invention relates to extrema coding, and in particular, to the use of a noisy limiting-amplifier in an extrema coding application. Even more particulary, the present invention relates to the use of commonly available limiting-amplifier integrated circuits or other integrated circuits having limiter circuits as one of their subcircuits. The basic extrema coding principle can be found in U.S. Pat. No. 4,545,065.

In extrema coding, an analog signal having broadband noise superimposed thereof or into which broadband noise is added, is first subjected to a preemphasis operation, generally differentiation, to encode the extrema points of the original analog waveform and the noise (i.e., the maximum and minimum points) as zero crossings. The zero crossings, which represent the extrema, are then encoded by an infinite clipping circuit having a high bandwidth relative to the original analog signal so as to create a binary or two-level signal. This binary or two-level signal contains substantially all of the information necessary to reproduce the original analog signal. In order to reproduce the original analog signal from the encoded signal, a filter, typically an integration stage, may be used. It has been theorized that the human ear performs this integration function naturally, so that an extrema coded signal supplied to the human ear will sound substantially the same as the original unencoded analog signal. It has also been theorized that the extrema coding principle also applies to the remainder of the human perception system, for example, the human visual system, so that an extrema encoded signal representing video information supplied to the human eye by a display device will also appear substantially the same as the original analog signal when supplied to the display device.

Various applications of extrema coding are possible, including bandwidth compression, coder-decoders (CODEC's), signal transmission across noisy channels, low bit rate data transmission and hearing aids and hearing protectors.

SUMMARY OF THE INVENTION

According to the present invention, it has been discovered that commonly available limiting-amplifier integrated circuits can be utilized to perform the clipping and noise source functions required in extrema coders. In particular, it has been discovered that if commonly available limiting-amplifier integrated circuits are operated with low level input signals, and that if the limiting-amplifier circuits employ several cascaded limiting-amplifier stages, internal broadband random noise generated in the limiting-amplifier stages is amplified to a sufficient level so that it is approximately of the same order as the input signals. Accordingly, the noise necessary during clipping according to the extrema coding principle is provided. The input signals are also infinitely clipped by the cascaded limiting-amplifier stages. The input analog signal need only be differentiated and attenuated to the level of the internally generated noise before being supplied to the limiting-amplifier stages. Conveniently, the steps of noise generation and clipping are performed by one integrated circuit chip.

Accordingly, it is an object of the present invention to provide a relatively simple and inexpensive extrema coder.

It is furthermore an object of the present invention to provide such an extrema coder wherein both the noise generation and clipping functions are performed by one integrated circuit.

It is furthermore an object of the present invention to provide an extrema coder wherein a commonly available integrated circuit can be used for implementing the noise generation and clipping functions required of extrema coders.

The above and other objects of the present invention are achieved by an extrema coder comprising means for detecting the times of occurrence of minimum and maximum values of the signal, thereby producing a detected signal, limiting amplifier means coupled to the means for detecting for encoding the times of occurrence of minimum and maximum values of the analog signal, and further for generating internally in said limiting amplifier means a substantially random noise signal, the noise signal having a broadband spectrum having frequencies in a frequency range substantially higher than the highest frequency in the analog signal whereby the limiting-amplifier means encodes the times of occurrence of the minimum and maximum values of the analog signal in the presence of the noise as an encoded signal, the limiting amplifier means having a bandwidth greater than the bandwidth of the analog signal, the encoded signal containing information sufficient to enable substantial reproduction of the analog signal therefrom.

BRIEF DESCRIPTION OF THE DRAWINGS

The present invention will be described in greater detail in the following detailed description with reference to the drawings in which.

DETAILED DESCRIPTION

Figure 1:
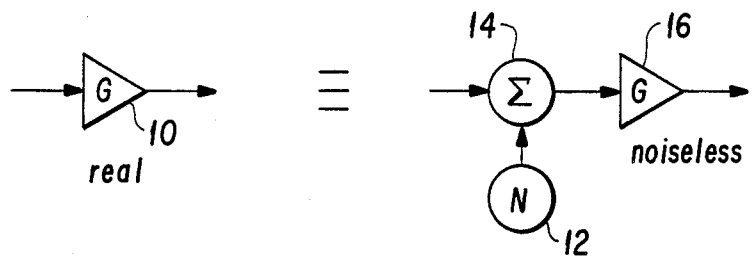
FIG. 1 is a schematic diagram showing how an actual noisy amplifier circuit, which can be found in many commonly available integrated circuits, can be represented as a wideband noise source, a summing stage and a noiseless amplifier circuit.
Figure 2:
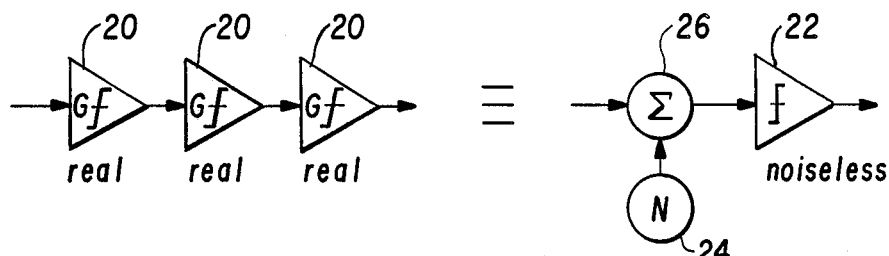
FIG. 2 shows how several cascaded limiter stages can be represented as a wideband noise generator, a summing stage and an infinite clipper.

With reference now to the drawings, FIG. 1 is a schematic diagram showing how a real amplifier circuit 10 can actually be represented as the sum of three components, a noise generator 12, a summing circuit 14 and a noiseless amplifier 16. The amplifier may also perform a limiting function as in many commonly available integrated circuit chips, especially those which are used for FM IF amplification, where the frequency or phase information, as opposed to the amplitude information, is important. Generally, several cascaded limiting-amplifier stages are employed, and because of the high overall gain, the output of such cascaded limiting-amplifier stages is an infinitely clipped signal. This is shown in FIG. 2, where a group of cascaded real limiting-amplifiers 20 can be represented as one noiseless infinite clipper 22, a noise source 24 and a summing circuit 26.

In typical FM IF amplifiers, limiting-amplifiers are used to retrieve only the frequency or phase information from the input signal. Accordingly, a number of cascaded limiting amplifiers having very high bandwidth are employed for this purpose. A typical such chip is the TBA120 manufactured by Motorola, which includes an FM IF amplifier, limiter, FM detector and audio preamplifier. The front end of such a chip includes a number of cascaded limiting FM IF amplifier stages. However, because of the high overall gain of this amplifier, the internal noise generated, for example, by transistor junctions in the first few stages, is amplified and further limited in the following stages, until it appears at the output of the last amplifier stage as infinitely clipped noise, as shown in FIG. 2, where several limiting-amplifier stages are shown in cascade.

Figure 3A:
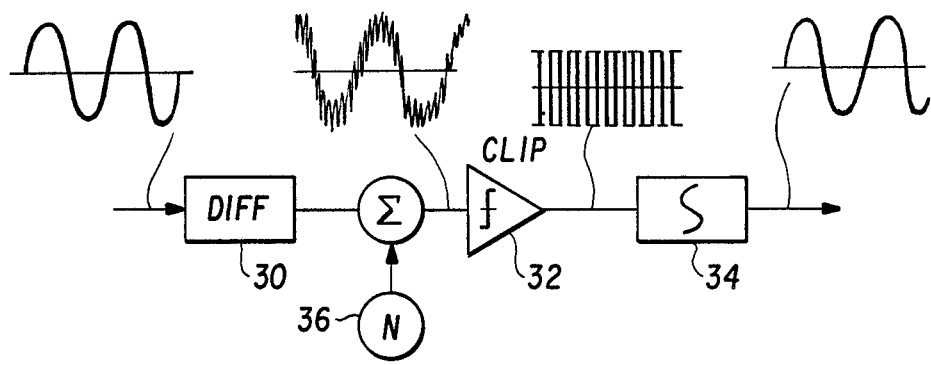
FIGS. 3a and 3b are block diagrams of the basic extrema coding circuits.
Figure 3B:
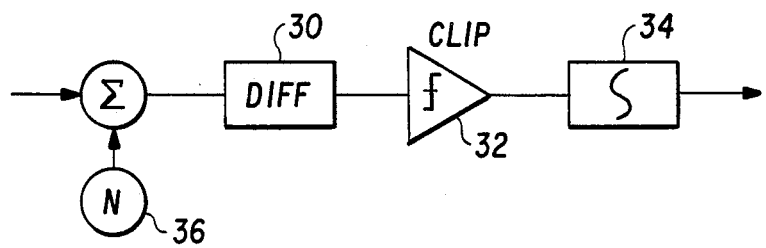

According to the invention, it has been realized that such limiting-amplifiers having high bandwidth are suitable for use in extrema coding. In extrema coding, as shown in FIGS. 3a and 3b, typically a differentiator 30 converts the extrema of the input analog signal to zero crossings. The values of the extrema, as opposed to their times of occurrence, are unimportant. The zero crossings, which represent the times of occurrence of the extrema, are then encoded as transitions of a binary signal by an infinite clipper 32. The output of the infinite clipper is then coupled to a filter 34, for example, an integrator, by which the original analog signal can be substantially restored. FIGS. 3a and 3b show two embodiments of circuits for implementing extrema coding. What is significant about extrema coding is that wideband random noise, which is either present in the input analog signal or added to the analog signal by a noise generator 36, as shown in FIGS. 3a and 3b is required. As shown in FIGS. 3a and 3b, if insufficient wideband noise is present in the input analog signal, wideband noise can be added either before (FIG. 3b) or after differentiation (FIG. 3a), but before the clipping process occurs. Accordingly, for extrema coding, it is significant that the clipping circuit must encode the zero crossings of the differentiated analog signal and the noise signal, whether the noise be differentiated or not. Accordingly, the infinite clipper must have a bandwidth substantially greater than the bandwidth of the input analog signal if it is to be able to clip the noise signal. It has been theorized that extrema coding functions by, in a sense, pulse width modulating the noise signal with the input analog signal, so the high bandwidth of the clipper is important if the noise signal is to be sufficiently clipped. FIG. 3a shows typical waveforms present as various points in the circuit.

Figure 4:
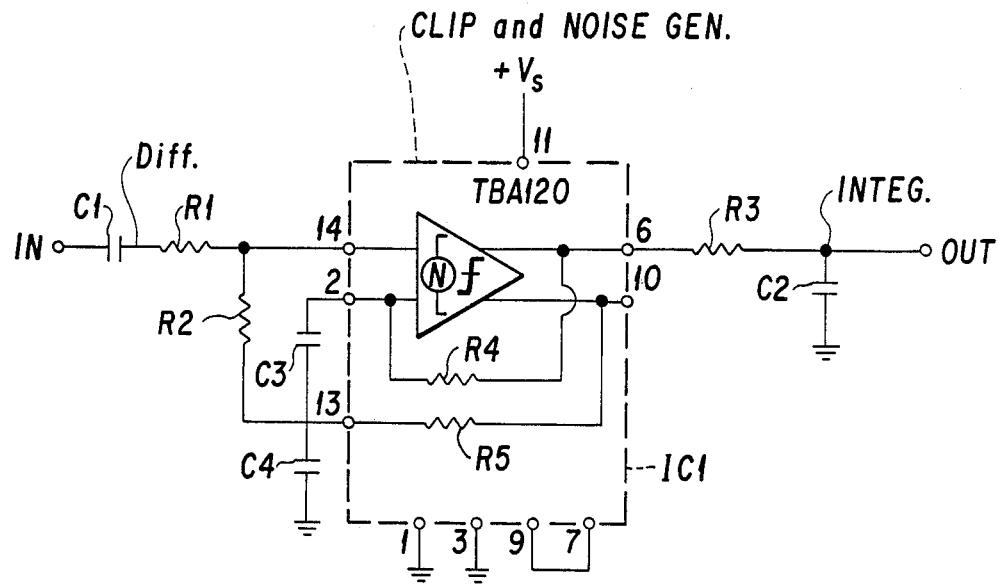
FIG. 4 is a schematic diagram showing how a commonly available integrated circuit can be utilized as an extrema coder.

FIG. 4 shows the application of a typical noisy limiting-amplifier integrated circuit as an extrema coder. In the embodiment shown in FIG. 4, a TBA120 integrated circuit, available from Motorola, for example, is used. Only the input IF amplifier and limiting section of the integrated circuit is utilized. The FM detector and audio preamplifier sections of the integrated circuit are not used. Other integrated circuits which also have a limiting-amplifier section could equally well be used, provided they have a sufficiently high bandwidth so that the noise signal will be clipped. A very convenient feature of the embodiment shown in FIG. 4 is that the internal noise generated by, for example, transistor junction noise in the limiting-amplifier stages is utilized as the noise source. Accordingly, no special noise source need be provided. Although typically the noise generated in the limiting-amplifier integrated circuit of the type shown in FIG. 4 is very small, for example, about 35 microvolts RMS, and in a normal FM IF amplifier circuit this noise is negligible, in the circuit shown in FIG. 4, the analog signal provided to the input of the limiting-amplifier stages is of the same magnitude as the noise signal. Whereas in typical FM applications, large input signals are used essentially to override the internal noise by a significantly large factor, in the application shown in FIG. 4, very low input signals of the same order of magnitude are applied to the input of the clipper stage. Accordingly, the input signal is summed to the internal noise generated, and the cascaded limiting-amplifier stages produce an infinitely clipped signal which is an extrema coded version of the input analog signal. Also, in typical FM IF applications, band filtering is utilized to reduce the bandwidth of the limiting amplifier stages, which will accordingly reduce the bandwidth and therefore the power of the noise signal. In the application shown in FIG. 4, however, no external band filters are employed and thus the bandwidth of the noise signal is not reduced.

As shown in FIG. 4, differentiation of input signals of up to 5 kHz is obtained by capacitor C1 and resistor R1. Resistors R1 and R2 attenuate the differentiated signal to the order of magnitude of the internal noise signal generated in the clipping stage. The clipping stage is represented by the FM IF amplifier section of the TBA120 integrated circuit. At the output of the clipping stage, frequencies above 100 Hz are integrated by resistor R3 and capacitor C2 to retrieve the original signal. Capacitors C3 and C4 are provided for decoupling of bias feedback. Resistors R4 and R5 schematically represent feedback resistance present in the limiting-amplifier integrated circuit stages. The inputs of the FM detector section of the TBA120 chip, shown by pins 7 and 9, are shorted to disable this function, as this function is not required in the extrema coding application. Accordingly, with a very simple circuit, the extrema coding principle has been realized. The circuit shown in FIG. 4 includes all the basic components for an extrema coder, yet does not require the provision of a separate noise source, because the noise is internally generated in the limiting-amplifier integrated circuit stages.

The limiting amplifier utilized in the circuit of FIG. 4 provides a convenient way of performing extrema coding because the amplifier has a very high bandwidth, and the cascaded limiting stages, because of the high gain, perform infinite clipping, and, accordingly, these stages can clip the internal high bandwidth noise generated in the integrated circuit. In order to make the circuit operate as an extrema coder, it is important that the signal supplied to the input of the limiting-amplifier stages be of the same order of magnitude as the internal noise signal so that the noise and input signal are properly summed and clipped.

Components and values for the circuit shown in FIG. 4 may be as follows:

TABLE 1

| | |
|---|---|
| R1 - | 100K ohms |
| R2 - | 47 ohms |
| R3 - | 1K ohms |
| C1 - | 330 pF |
| C2 - | 1.5 uF |
| C3 - | 100 uF |
| C4 - | 10 uF |
| IC1 - | TBA120 |

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. An apparatus for processing an analog signal comprising:

means for detecting the times of occurrence of minimum and maximum values of said analog signal, thereby producing a detected signal; and limiting-amplifier means coupled to said means for detecting for encoding said times of occurrence of minimum and maximum values of said analog signal, and further for generating internally in said limiting amplifier means a substantially random noise signal, said noise signal having a broadband spectrum having frequencies in a frequency range substantially higher than the highest frequency in the analog signal, whereby said limiting amplifier means encodes the times of occurrence of the minimum and maximum values of said analog signal in the presence of said noise as an encoded signal, said limiting-amplifier means having a bandwidth greater than the bandwidth of the analog signal, said encoded signal containing information sufficient to enable substantial reproduction of said analog signal therefrom.

2. The apparatus recited in claim 1 wherein said means for detecting comprises differentiator means for converting the times of occurrence of minimum and maximum values into time axis zero crossings and said limiting-amplifier means comprises infinite clipping means for encoding said time axis zero crossings into transitions of a biinary signal.

3. The apparatus recited in claim 1, further comprising means for attenuating said analog signal to approximately the level of said noise signal.

4. The apparatus recited in claim 2, further comprising means coupled to said limiting amplifier means for restoring said analog signal.

5. The apparatus recited in claim 4, wherein said means for restoring comprises integrating means.

6. The apparatus recited in claim 1, wherein said limiting-amplifier means comprises a plurality of cascaded limiting-amplifiers performing infinite clipping.

7. The apparatus recited in claim 1, wherein said limiting-amplifier means comprises a limiting-amplifier integrated circuit means.

8. The apparatus recited in claim 7, wherein said integrated circuit means comprises an FM IF amplifier limiting-amplifier means.

9. A method for extrema coding an analog input signal comprising the steps of:

converting maximum and minimum values of said analog input into time axis zero crossings of a detected signal;

providing said time axis zero crossings representing the times of occurrence of maximum and minimum values of said analog signal to a limiting-amplifier means for encoding said times of occurrence of minimum and maximum values into an encoded signal;

internally generating in said limiting-amplifier means wideband random noise having a frequency spectrum having frequencies in a frequency range substantially higher than the highest frequency in the analog signal, whereby said noise is superimposed on said detected signal, said limiting-amplifier means thereby converting the time axis zero crossings of said detected signal and time axis zero crossings of said noise into transitions of a binary signal, said binary signal containing information sufficient to enable substantial reproduction of said analog signa therefrom.

10. The method recited in claim 9 further comprising the step of attenuating said analog signal so that the level of said analog signal is approximately the same as the noise generated by said limiting-amplifier means.

11. The method recited in claim 9, wherein said step of converting comprises differentiating said analog signal.

12. The method recited in claim 9, wherein said step of providing comprises providing said detected signal to a plurality of cascaded limiting-amplifier means, thus implementing infinite clipping.

* * * * *